A. A. LONG.
TIRE TOOL.
APPLICATION FILED JULY 26, 1906.

1,025,987.

Patented May 14, 1912.
2 SHEETS—SHEET 1.

Witnesses
Walter B. Payne
Russell B. Griffith

Inventor
Adam A. Long
By Church & Rich
his Attorneys

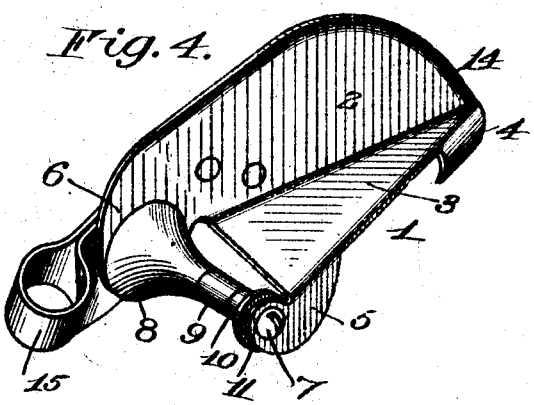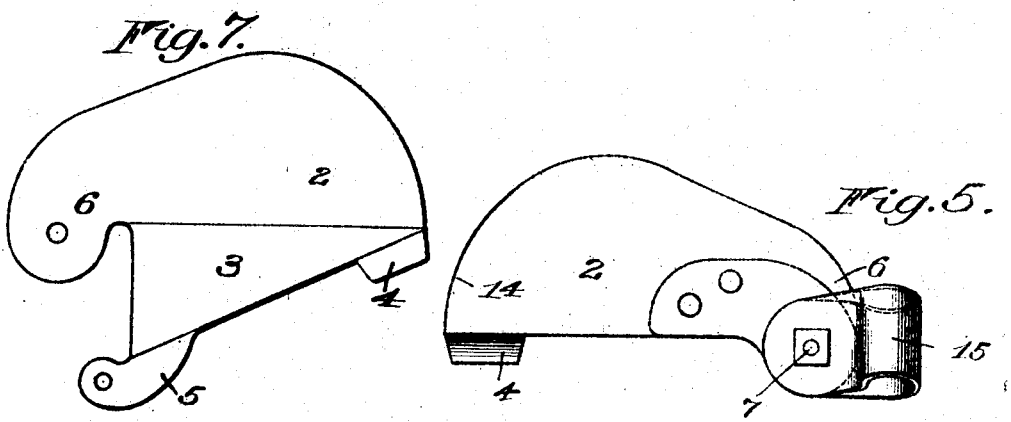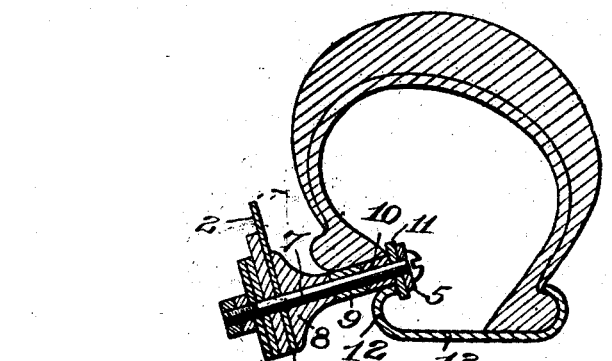

UNITED STATES PATENT OFFICE.

ADAM A. LONG, OF ROCHESTER, NEW YORK.

TIRE-TOOL.

1,025,987. Specification of Letters Patent. Patented May 14, 1912.

Application filed July 26, 1906. Serial No. 327,833.

*To all whom it may concern:*

Be it known that I, ADAM A. LONG, of Rochester, in the county of Monroe and State of New York, have invented certain new and useful Improvements in Tire-Tools; and I do hereby declare the following to be a full, clear, and exact description of the same, reference being had to the accompanying drawings, forming a part of this specification, and to the reference-numerals marked thereon.

My present invention relates to means for adjusting the tires of vehicle wheels, and it has for its object to provide a device of this nature particularly adapted for use in applying the casings of pneumatic tires to their rims or removing them therefrom which will greatly reduce the manual labor involved in these operations and allow a rapid manipulation of the tire without subjecting it to injury.

My improvements are further directed toward simplicity of construction and economy of manufacture.

To these and other ends the invention consists in certain improvements and combinations of parts all as will be hereinafter more fully described, the novel features being pointed out in the claims at the end of the specification.

Figure 1:
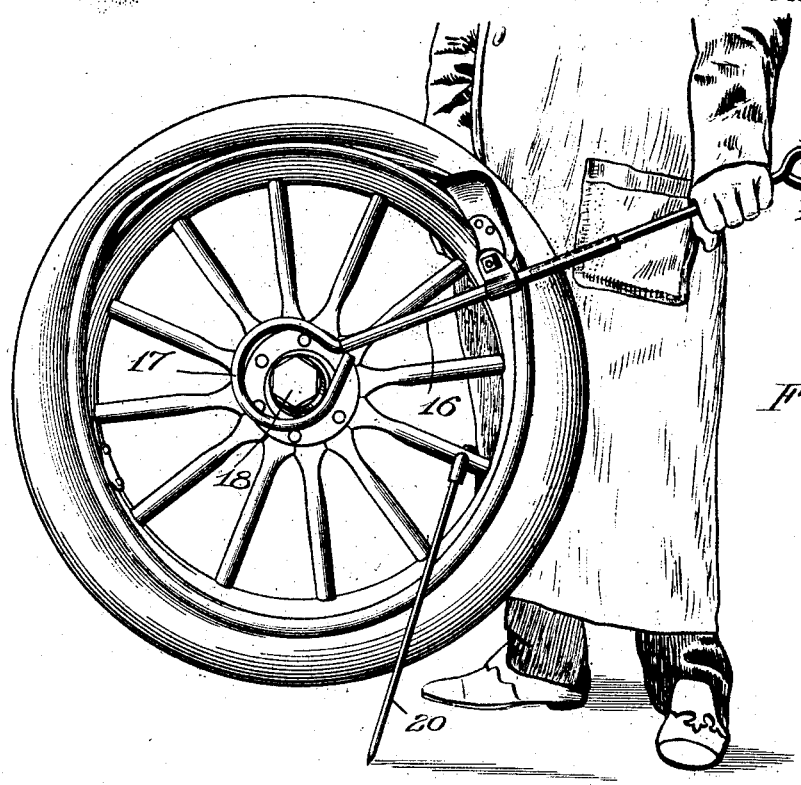
Figure 2:
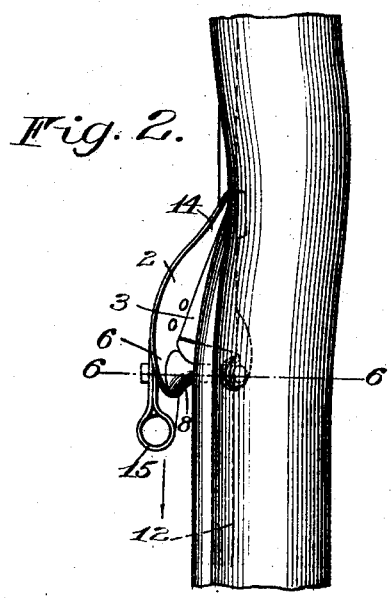
Figure 3:
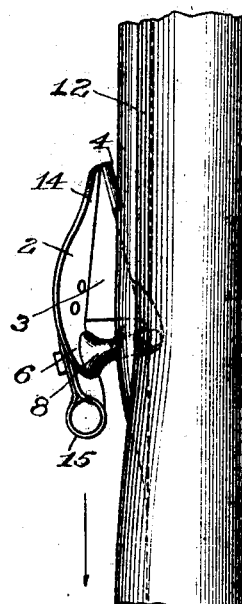

In the drawings: Figure 1 is a side elevation of a vehicle wheel with my adjuster thereon in position for applying the outer edge of the tire to the rim. Fig. 2 is a top plan view of the tire and rim of a wheel with the adjusting shoe in the position it occupies when used in applying the tire. Fig. 3 is a similar view with the adjusting shoe in position for removing the tire. Fig. 4 is a perspective view of the adjusting shoe. Fig. 5 is a side view thereof. Fig. 6 is a transverse sectional view taken on the line 6—6 of Fig. 2, and Fig. 7 shows the blank from which the body portion of the shoe is formed.

Similar reference numerals in the several figures indicate similar parts.

A device constructed in accordance with my invention is of particular value for use upon the pneumatic rubber tires of automobile wheels, which usually embody a strong outer casing of heavy and relatively stiff material having beads or flanges upon its edges adapted to bear against or engage beneath the flanges upon the rim of the wheel and inclosing a soft inner tube, the beads being held clenched against the flanges by clamps or lugs or by the pressure produced through the inflation of the tire. The frequency with which these tires become deflated either from punctures through the casing or by reason of the bursting of the inner tube through various causes, make it desirable that there be means convenient to the operator, whereby the outer bead, at least, of the casing may be quickly and easily removed from the rim, to permit the withdrawal of the inner tube for repairs, and its replacement in its former position. To these ends, I provide a device embodying generally a shoe of proper configuration which travels upon the flange of the rim in contact with the bead of the tire and forces the latter either on or off at the option of the operator, when rotated in the proper direction throughout the circumference of the wheel, preferably by means of an adjustable lever having a fulcrum bearing upon the hub of the latter.

Referring to the drawings 1 indicates a preferably sheet metal shoe which may be conveniently formed from a blank punched as shown in Fig. 7, the outer edge thereof being bent substantially at right angles to its face to form a guard 2 which extends at an angle to the opposite edge of the triangular bottom plate 3, converging therewith at the narrower end of the latter, where a downwardly-projecting and slightly curved flange 4 is provided. At its opposite or broader extremity, the bottom plate is provided with a somewhat similar flange 5, which, however, extends beyond the end thereof and substantially opposite a corresponding extension 6 of the guard 2, the said parts forming supports for the ends of a pintle 7 extending transversely in alinement with the bottom plate. Upon this pintle are mounted rollers 8, 9, 10 and 11, the roller 8 being conical with the end of greatest diameter against the guard, and the other or smaller end abutting the rollers 9. Against the flange 5 is arranged the disk shaped wheel or roller 11 of sufficient diameter to project well above the others and the adjacent parts including the intermediate roller 10 arranged next thereto and of corresponding diameter with the roller 9 on its other side.

To remove a tire of the type hitherto referred to, the bead thereof is pried up sufficiently to allow of the flange 5 being hooked over the flange 12 of the rim 13, the edge of the tire resting upon either of the rollers 8 or 9 according to its size, in which position it is retained and prevented from slipping back by the roller 11 engaging its inner side and by the downward angle at which the device is held as shown in Figs. 3 and 6. When the shoe is then moved along the rim, the rollers 9 and 10 bearing upon the flange thereof, the tire will be gradually forced from engagement therewith by one or another of the rollers and fall upon the outer side of the flange in rear of the device as it travels, until the entire circumference has been traversed, the roller 11 preventing it from slipping back by engaging the inner surface thereof. The outer bead will then be completely disengaged and the rest of the tire may be easily removed from the rim in the ordinary manner.

To replace the tire, the shoe is inserted in much the same manner, except that the flange or projection 4 is also hooked over the flange of the rim, bringing the edge 14 of the guard well in toward the tire and the device is held more nearly in a horizontal position. When drawn along the rim, the bead of the tire is raised sufficiently by the rollers to clear the latter, while the guard 2 operates to guide or press it inwardly into proper position behind the flange of the rim, as shown in Fig. 2. The shoe may then, by an upward movement, be easily disengaged. The edges of the guard are rounded or rolled slightly to prevent injury to the surface of the tire when in contact therewith.

In operating upon light tires a suitable handle (not shown) may be formed upon an extension of the pintle 7 for drawing the device along the rim, but the larger and heavier ones are more difficult of manipulation. I, therefore, provide an attachment upon the shoe, preferably an eye 15, stamped from sheet material and pivoted to the projecting end of the pintle 7, forming a link through which is passed (in adjustable relation thereto, after the shoe has been put in place,) the end of a tubular rod 16, the other end of which is preferably provided with an eye 17 adapted to encircle and bear against the hub 18 of the wheel, as shown in Fig. 1; and protected to prevent marring the same by a covering of rubber, leather or other non-abrasing material, though a yoke might answer the purpose or other suitable bearing connections might be made with that or other portions of the wheel. In the end of the said rod is adapted to be inserted a smaller rod 19 serving as a handle to the adjustable lever thus formed, having its fulcrum upon the hub of the wheel, whereby the shoe may be drawn along the rim with comparative ease. The rod 19 is permitted, of course, to project out of the tube as far as the mud guards or other projecting portions of the vehicle will allow to gain greater leverage, while it is convenient to employ a short post 20, to lock the wheel against rotation during the operation, as shown in Fig. 1. The end of the rod may also be flattened for use in inserting the shoe beneath the tire in the first instance, as before described.

A device of this nature embodying my invention can be made light and strong at small cost of manufacture, yet of a size whereby it may be conveniently carried in a tool kit or packed within a small space, the adjustable features of the lever and its sliding connection with the shoe making the one device applicable to tires and wheels of all sizes and operable in spite of the otherwise unfavorable proximity of mud guards or other adjacent obstructions. By its use a large amount of time can be saved in an operation which the drivers of motor cars are frequently called upon to accomplish while the labor attendant thereto is greatly reduced.

I claim as my invention:

1. In a tire tool, the combination with a tire-engaging shoe comprising a bottom plate adapted to travel on the rim of a wheel and provided with a downward projection on one edge thereof adapted to engage the flange of the wheel rim and a guard on the opposite edge, of a roller having a journal supported at one end in the plane of the said rim-engaging projection and in the guard at the other.

2. In a tire tool, the combination with a tire engaging shoe comprising a bottom plate provided with a flange at one edge adapted to engage the flange of a wheel rim and with oppositely arranged extensions substantially perpendicular to the bottom plate and projecting beyond one end thereof, one of said extensions being arranged in the plane of the flange, of a roller supported between said extensions.

3. In a tire tool, the combination with a tire-engaging shoe embodying a bottom plate adapted to travel upon the wheel rim having a projection for engagement with the flange thereof upon one side and a guard at the other, of a pintle having one end secured to the guard and a conical roller journaled on the pintle with the end of greater diameter against the guard for raising the tire and guiding it inwardly upon the rim.

4. In a tire tool, the combination with a tire-engaging shoe comprising a bottom plate provided with a downward projection on one edge thereof adapted to engage the flange of a wheel rim and a guard on the opposite edge, of a pintle having one end thereof supported in the plane of the said rim-engaging projection and the other supported in the guard and extending therethrough, a roller on the pintle, an eye pivoted on the projecting end of the pintle and an operating handle extending through the eye.

5. A tire tool, comprising a tire-engaging shoe adapted to travel on the rim of a wheel and formed of a single piece of sheet metal bent downwardly at one edge to engage the flange of the rim and upwardly at the opposite edge to form a guard, and a roller extending transversely of the shoe and rim on a journal supported by the guard.

6. In a tire tool, the combination with a tire-engaging shoe comprising a bottom plate adapted to travel on the rim of a wheel and provided with a downward projection at one edge thereof for engagement with the flange of the rim, of a pintle mounted thereon to project inwardly beyond the flange at one end when the device is in use, a roller journaled on the pintle to run on the flange and a second roller of greater diameter than the first journaled on the said projecting end of the pintle for engagement with the inner surface of a pneumatic tire.

7. In a tire tool, the combination with a shoe adapted to travel on the rim of a vehicle wheel beneath the tire and having a projection for engagement with the inner side of the flange thereof, of an operating lever having a sliding and separable connection therewith and provided with an eye for revolubly engaging the hub of the wheel as a fulcrum.

8. In a tire tool, the combination with a shoe adapted to travel on the rim of a vehicle wheel beneath the tire and having a projection for engagement with the inner side of the flange thereof, of an operating lever pivoted to said shoe to move relatively thereto in a plane parallel with that of the wheel and adapted to engage the hub of the wheel as a fulcrum.

9. In a tire tool, the combination with a shoe adapted to travel on the rim of a vehicle wheel underneath the tire and having a projection for engagement with the inner side of the flange thereof, of an operating lever having a pivotal and sliding connection with said shoe to move relatively thereto in a plane parallel with that of the wheel and adapted to engage the hub of the latter as a fulcrum.

10. In a tire tool, the combination with a shoe adapted to travel on the rim of a vehicle wheel beneath the tire and having a projection for engagement with the inner side of the flange thereof, of an operating lever having a pivotal and sliding connection with said shoe to move relatively thereto in a plane parallel with that of the wheel and provided with an eye for revolubly engaging the hub of the latter as a fulcrum.

11. In a tire tool, the combination with a shoe adapted to travel on the rim of a vehicle wheel beneath the tire and having a projection for engagement with the inner side of the flange thereof, of a link pivoted to said shoe to move relatively thereto in a plane parallel to that of the wheel and an operating lever having a sliding connection with the link and adapted to engage the hub of the wheel as a fulcrum.

12. In a tire tool for adjusting the pneumatic clencher tires of wheels having flanged rims, the combination with a shoe adapted to travel upon the wheel rim, of a roller mounted thereon to revolve upon an axis extending transversely of the flange of the rim between the latter and the tire and a member arranged at the inner end of the roller and extending upwardly above the periphery thereof to engage the inner edge of the tire.

13. In a tire tool for adjusting the pneumatic clencher tires of wheels having flanged rims, the combination with a shoe adapted to travel upon the wheel rim, of a roller mounted thereon to revolve upon an axis extending transversely of the flange of the rim between the latter and the tire and a second roller of greater diameter than the first arranged at the inner end of the latter and journaled upon the same axis for engagement with the inner edge of the tire.

14. In a device of the character described; an arm adapted to be inserted between the tire and the rim of the wheel and to react on the rim and a support adapted to hold such arm at an operative angle with the plane of the wheel with one end engaging between the rim and the tire and the other end extending in a direction oblique to the axis of the wheel and effectively in a plane radial thereto.

15. In a device of the character described; a roller and means reacting on the rim for revolubly supporting and holding the roller at an operative angle with the plane of the wheel to form a rolling incline engaging between the tire and the rim and extending within and outside of the tire-engaging edge of the flange of the rim, adapted to support and force the inner edge of the tire over the flange of the rim.

16. In a device of the character described; a roller and means reacting on the rim of the wheel for revolubly supporting and holding the same at an operative angle with the plane of the wheel to form a rolling incline engaging between the tire and the rim and extending within and outside of the tire-engaging edge of the flange of the rim, adapted to support and force the inner edge of the tire over the flange of the rim and means for advancing such roller relatively to and around the rim of the wheel.

17. A tire tool comprising an arm reactively engaging the rim of the wheel and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim.

18. A tire tool comprising an arm reactively engaging the rim of the wheel and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim and means for advancing such roller relatively to and around the rim of the wheel.

19. A tire tool comprising an arm reactively engaging the rim of the wheel and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim, and a guard at the inner end of the roller and projecting above the roller to engage the tire to retain the tire upon the roller.

20. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim, and a guard distinct from the roller at the inner end of the roller formed to present a smooth and rounded surface to the inner tube and projecting above the roller.

21. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim, and a guard rotatable independently of the roller and at the inner end of the roller and projecting above the roller to engage the tire to retain the tire upon the roller.

22. A tire tool comprising an arm and revolubly supported thereon a roller adapted to be held by such arm at an operative angle with the plane of the wheel to form a rolling incline engaging between the tire and the rim and extending within and outside of the tire-engaging edge of the flange of the rim to support and force the inner edge of the tire over the flange of the rim, and a guard rotatable independently of the roller at the inner end of the roller formed to present a smooth and rounded surface to the inner tube and projecting above the roller.

ADAM A. LONG.

Witnesses:
 RUSSELL B. GRIFFITH,
 WALTER B. PAYNE.